UNITED STATES PATENT OFFICE.

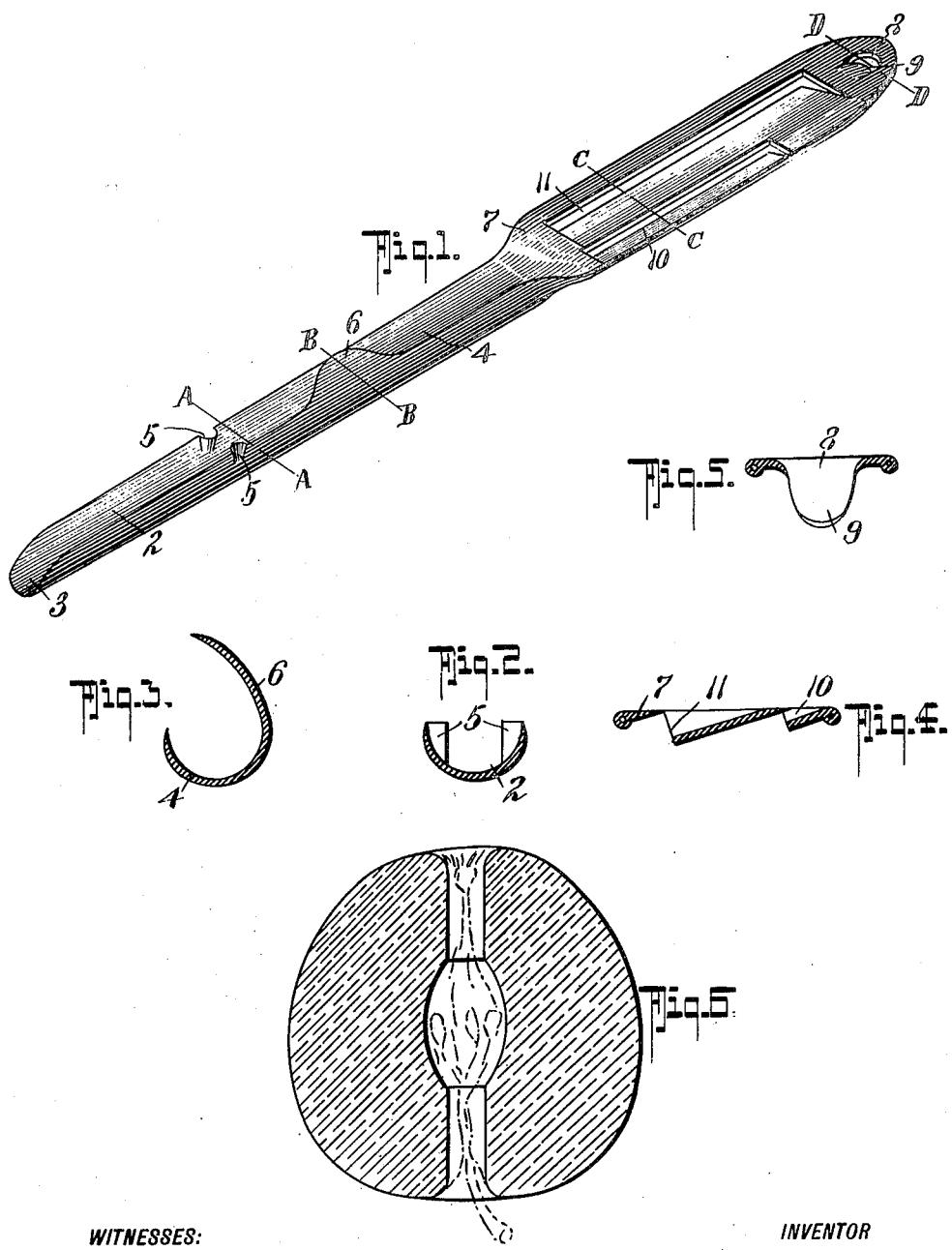

WALTER T. ROSS, OF VANCOUVER, BRITISH COLUMBIA, CANADA.

APPLE CORER, PEELER, AND SLICER.

934,840.   Specification of Letters Patent.   Patented Sept. 21, 1909.

Application filed January 26, 1909. Serial No. 474,237.

*To all whom it may concern:*

Be it known that I, WALTER T. ROSS, a citizen of the Dominion of Canada, residing at Vancouver, in the Province of British Columbia, Canada, have invented a new and useful Apple Corer, Peeler, and Slicer, of which the following is a specification.

This invention relates to a device for removing the core of an apple, and in combination therewith provision whereby the apple may be peeled and sliced. This last named portion of the device is equally applicable for peeling and slicing potatoes or other vegetables.

In devices at present in use for removing the core from an apple the work is incompletely done as a cylindrical portion is merely removed from stalk to nose and the wings of the seed cavity are left in the fruit: Further this imperfect removal necessitates the cylindrical removed portion being larger than it otherwise would be in an effort to remove as much of the seed cavity as possible consistent with economy.

A principal object in the invention which is the subject of this application has been the removal of a minimum dimension of the cylindrical portion first taken out and the subsequent removal of all the seed cavity.

The invention is particularly described in the following specification reference being made to the drawings by which it is accompanied, in which—

Figure 1 is a perspective view of the device, Figs. 2, 3, 4, and 5 cross sections at A, B, C, and D respectively, and Fig. 6 a cross section of an apple from which the core has been removed by its use.

The device comprises a portion 2 formed as a segment of a hollow cylinder of thin sheet metal or other suitable material the end 3 of which is reduced to form an entering point. This semi-cylindrical portion is produced as at 4 so that 3 and 4 together are approximately double the length of an ordinary apple, but between 2 and 3 the sides of the segment are inwardly crimped as at 5 for a reason which will be explained later, and about the midlength of 4, a portion 6 projects curved in profile and inwardly bent. The edge of 4 on which the projection 6 is left and the edge of 6 itself are sharpened to a sufficient extent only to freely cut the apple or its seed casing.

Beyond the end of 4 the device is flattened as at 7 and strengthened along its edges and at the extreme upper edge an aperture 8 is pierced by which the device may be hung up, the portion punched from 8 being outwardly projected as at 9 and curved somewhat to afford a device by which the eyes of a potato or spots or blemishes may be removed from the fruit or vegetable on which it is employed.

The flat portion 7 is longitudinally split as at 10 and 11, and one of the split edges of each is sharpened and the other stamped outward as shown in Fig. 4; 10 being stamped out only slightly, to be used for peeling a fruit or vegetable, and 11 to a greater extent that it may be used for slicing.

In the use of the device the portion 2 is passed into the apple from stalk to "nose" and rotated in it by which action a portion of the core and its connected woody fiber is removed as a thin cylinder. The portion 4 is then pressed into the apple, the projection 6 cutting its way through to the center where the wings of the seed cavity of the core have been left when the cylindrical portion was removed. The device is then rotated in the apple and the projection 6 will remove entirely the remainder of the core left by 2. The device may be then withdrawn when the cylindrical portion carried by 2 and the remainder of the core carried in the hollow of 4 adjacent to 6 may be readily removed.

The crimps 5 hold the removed cylindrical portion and prevent it from being forced up into 4 and obstructing the action of 6 in cutting out the core, when the device is pressed farther in to bring the projection 6 into operation. It will be noticed that at no portion of the length of 2 and 4 do the edges close in within the width of a semicircle so that the removed portion of the apple can be shaken from the device, and it is not necessary to pick it out as is the common requirement with devices of this character where a removing portion such as 2 is prolonged from a tubular or approximately tubular portion into which the removed apple core is forced and from which it must be removed with some expenditure of trouble before the work can be proceeded with.

Having now particularly described my invention and the manner of its use I hereby declare that what I claim as new and desire to be protected in by Letters Patent is;

1. A means for removing the core and seed case of an apple comprising an elongated semi-cylindrical member and a seed case removing member projected from one edge of the semi-cylindrical member intermediate the ends of said semi-cylindrical member with the outer edge of said seed case removing member located at a greater distance from the longitudinal axis of the device than the edges of the semi-cylindrical member.

2. A device for removing the core of an apple, comprising a substantially semi-cylindrical member having a scoop like cutting end and having an integrally formed cutting member projected from one edge of the semi-cylindrical member intermediate its ends and having crimped portions between the projecting cutting portion and one end of said semi-cylindrical member.

3. As an article of manufacture, a device formed of a single piece of sheet metal and comprising a substantially semi-cylindrical portion having a scoop-like end and having an integrally formed cutting member projecting from one edge of the semi-cylindrical member intermediate its ends and having a flat portion at one end, said flat portion having a part stamped to form a slot, the edges of which slot being sharpened to form a paring or slicing knife, substantially as shown and described.

4. As an article of manufacture, a device formed of a single piece of sheet metal and comprising a substantially semi-cylindrical portion having a scoop-like end and having an integrally formed cutting member projecting from one edge of the semi-cylindrical member intermediate its ends and having a flat portion at one end, said flat portion having a part stamped to form a slot, the edges of which slot being sharpened to form a paring or slicing knife, and said flat end having a punched out tang portion to form a cutting projection for removing the eye of potatoes and the like.

5. A means for removing the core of a whole apple, comprising an elongated tubular semi-cylindrical penetrating member having a gouging projection from one of its edges intermediate the ends of the penetrating member, integrally formed with said member and of less length than said tubular member.

6. A means for removing the core of a whole apple, comprising an elongated semi-cylindrical member having a cutting end and provided with a curved integral cutting projection from one of the edges of said semi-cylindrical member, said cutting projection being located intermediate the ends of the semi-cylindrical member, substantially as shown and described.

In testimony whereof I have signed my name to this specification in the presence of two subscribing witnesses.

Vancouver 18th January 1909.

WALTER T. ROSS.

In the presence of—
 A. G. WOOLSEY,
 ROWLAND BRITTAIN.